United States Patent [19]
Sato et al.

[11] Patent Number: 4,987,017
[45] Date of Patent: Jan. 22, 1991

[54] THERMOPLASTIC ELASTOMER COMPOSITION AND FREON GAS HOSE MADE THEREOF

[75] Inventors: Hozumi Sato; Humito Shimada; Akio Sakaguchi; Yasuhiko Takemura; Tadaaki Nishi; Hisao Ono; Masanobu Nagano; Takumi Miyachi, all of Tokyo, Japan

[73] Assignee: Japan Synthetic Rubber Co., Ltd., Tokyo, Japan

[21] Appl. No.: 489,721

[22] Filed: Feb. 28, 1990

Related U.S. Application Data

[63] Continuation of Ser. No. 212,959, Jun. 27, 1988, abandoned.

[30] Foreign Application Priority Data

Jun. 26, 1987 [JP] Japan .................. 62-159179
Aug. 11, 1987 [JP] Japan .................. 62-200380
Nov. 20, 1987 [JP] Japan .................. 62-293180

[51] Int. Cl.$^5$ .................. F16L 11/04; F16L 11/08; F16L 11/20
[52] U.S. Cl. .................. 428/36.8; 428/34.7; 428/35.7; 525/178; 525/179; 525/184
[58] Field of Search .................. 525/184, 178, 179; 428/36.8, 35.7

[56] References Cited

U.S. PATENT DOCUMENTS

2,914,996 11/1959 Kelly .................. 525/184
4,207,404 6/1980 Coran et al. .................. 525/184

FOREIGN PATENT DOCUMENTS

54-080353 6/1979 Japan .
60-95294 7/1985 Japan .
1518639 7/1978 United Kingdom .
1552352 9/1979 United Kingdom .

*Primary Examiner*—Ana L. Carrillo
*Attorney, Agent, or Firm*—Oblon, Spivak, McClelland, Maier & Neustadt

[57] ABSTRACT

A thermoplastic elastomer composition which comprises 25-95% by weight of a polyamide and 75-5% by weight of a halogenated butyl rubber, a chlorosulfonated polyethylene or both thereof. Said composition is excellent in resistance to Freon gas permeation and has good oil resistance and low-temperature resistance. A hose wherein the layer to be contacted with a gas is made of the above thermoplastic elastomer composition is suitable as a Freon gas R-22 hose.

5 Claims, 2 Drawing Sheets

THERMOPLASTIC ELASTOMER COMPOSITION AND FREON GAS HOSE MADE THEREOF

This application is a continuation of application Ser. No. 07/212,959, filed on June 27, 1988, now abandoned.

BACKGROUND OF THE INVENTION

1. Field of the Invention

This invention relates to a thermoplastic elastomer composition which is rich in flexibility and excellent in balance of oil resistance, low-temperature resistance and resistance to permeation of Freon gas (air conditioning refrigerant) and the like, particularly to a thermoplastic elastomer suitable for hose materials.

2. Description of Prior Art

As a refrigerant for air-conditioner in automobiles, FREON gas R-12 ($CCl_2F_2$) has heretofore been generally used. However, recently, it has been clarified that FREON gas R-12 breaks the ozonosphere in the upper atmosphere and regulation of use of FREON gas R-12 is being internationally strengthened.

As a countermeasure, therefor, the change of the refrigerant from FREON gas R-12 to FREON gas R-22 ($CHClF_2$) is in progress. However, FREON gas R-22 has a greater permeability to hose materials consisting of elastomers than FREON gas R-12 and hence conventional vulcanized rubber materials consisting essentially of a nitrile rubber used for FREON gas R-12 are insufficient in resistance to permeation of FREON gas R-22.

Therefore, use of a metal tube for FREON gas R-22 is taken into consideration; however, this has such problems that noise is made by vibration during the running of a car and the degree of freedom of piping layout in a bonnet is reduced.

Also, the use of resin hoses consisting essentially of nylon is under consideration; however, there are problems similar to those in the case of use of a metal tube. Therefore, materials having excellent resistance to permeation of FREON gas R-22 have been desired.

SUMMARY OF THE INVENTION

The present inventors have made extensive research on the development of materials which are rich in flexibility, excellent in resistance to permeation of FREON gas R-22 and also excellent in low-temperature resistance which is required for FREON gas hose.

According to this invention, there is provided a thermoplastic elastomer composition suitable as a hose material which is excellent in resistance to permeation of FREON gases, particularly FREON gas R-22, and has good oil resistance and low-temperature resistance, and which comprises 25-95% by weight of a polyamide and 75-5% by weight of a halogenated butyl rubber, a chlorosulfonated polyethylene or both of the two.

This invention also provides a FREON gas hose wherein the layer to be contacted with FREON gas is made of the above thermoplastic elastomer composition in which the rubber component has been partially crosslinked.

Figure 1:
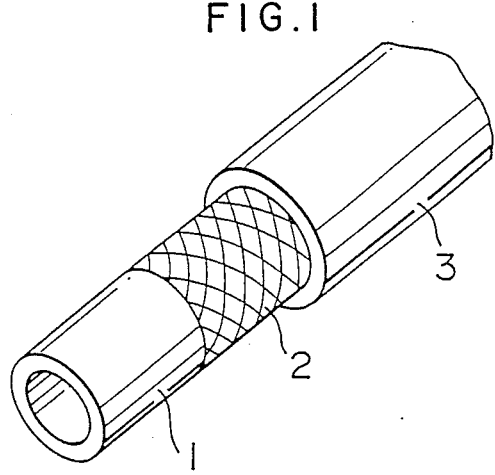
FIG. 1 is a sketch of a sample of the FREON gas hose of this invention in which 1 refers to an inner tube layer, 2 to a braided reinforcing layer and 3 to an outer tube layer.

The polyamide used in this invention includes homopolymer and copolymers of amide such as nylon 6, nylon 66, nylon 11, nylon 12, nylon 6-9, nylon 6-10, nylon 4-6 and the like; amide resins which are copolymers of amide with other kinds of monomers; polyamide elastomers synthesized by condensation between polyether and polyamide. Among these polyamides, preferred are rubber component and have relatively low melting points.

The halogenated butyl rubber used in this invention includes products of chlorination or bromination of butyl rubbers obtained by cationic polymerization of isobutylene or copolymerization of isobutylene with a small amount of isoprene.

The chlorosulfonated polyethylene includes vulcanizable elastomers which are known in the trade name of HYPALON and have a chlorine content of about 25-45% by weight, preferably 25-40% by weight.

In this invention, the halogenated butyl rubber and/or the chlorosulfonated polyethylene are used, and the use of the former alone is preferred.

In this invention, a crosslinking agent may optionally be used, and this crosslinking agent may be any one usually used in the vulcanization of the halogenated butyl rubber and the chlorosulfonated polyethylene. It includes methylolated alkylphenol-formaldehyde resins, brominated alkylphenol formaldehyde resins, morpholine disulfide, tetramethylthiuram disulfide, sulfur, diamines, organic peroxides and the like. If necessary, co-crosslinking agents may be used.

In the present composition, the proportion of the polyamide is 25-95% by weight, preferably 30-80% by weight and more preferably 40-70% by weight, based on the total weight of all the polymer components. When the polyamide proportion exceeds 95% by weight, the composition is poor in flexibility, and when it is less than 25% by weight, the composition has too low a strength to use as a thermoplastic elastomer in a FREON gas hose, and is inferior in oil resistance and processability.

In the present composition, the proportion of the halogenated butyl rubber and/or the chlorosulfonated polyethylene is 75-5% by weight, preferably 70-20% by weight and more preferably 60-30% by weight, based on the total weight of all the polymer components.

The polyamide and the halogenated butyl rubber and/or the chlorosulfonated polyethylene can be mixed by any mixing method which can be usually used in the production of a compound comprising a resin and a rubber. Specifically, the predetermined amount of the polyamide and the predetermined amount of the halogenated butyl rubber and/or the chlorosulfonated polyethylene are melt-mixed by means of a roll mill, an extruder or a closed type mixer such as Banbury mixer, pressure kneader or the like. In this method, the rubber can be crosslinked by adding a crosslinking agent as mentioned above. The amount of the crosslinking agent added is preferably 0.1-10 parts by weight per 100 parts by weight of the halogenated butyl rubber and/or the chlorosulfonated polyethylene.

Also, if necessary, there may be compounded softening agents and plasticizers for rubber; fillers such as carbon black, white carbon, clay, talc, calcium carbonate and the like; antioxidants; heat stabilizers; ultraviolet absorbers; coloring agents; processing aids; lubricants and the like, which are all known as additives and compounding agents for rubber, in appropriate amounts. Moreover, a part of the halogenated butyl rubber may be replaced by a butyl rubber or chlorinated polyethylene.

When the thermoplastic elastomer composition of this invention is used in a FREON gas hose, the thermoplastic elastomer composition may be used alone or in combination with a braid. Alternative, the thermoplastic elastomer composition may be used as an inner tube layer together with a vulcanized compound of chloroprene rubber or ethylene-propylene rubber which is broadly used as an outer tube layer to form a composite hose. In this case, other thermoplastic elastomer compositions, for example, polypropylene/ethylenepropylene copolymer thermoplastic elastomer, polyester-based thermoplastic elastomer and the like may be used as the outer tube layer. In addition, the thermoplastic elastomer composition of this invention may be formed into a thin film which may then be bonded as a layer to be contacted with FREON gas to other vulcanized rubber composition or other thermoplastic elastomer tube.

The FREON gas hose of this invention can be produced in a conventional manner. A single tube of the thermoplastic elastomer composition of this invention can be used as the FREON gas hose, and the thermoplastic elastomer of this invention can also be formed into the innermost tube of a composite FREON gas hose.

Figure 2:
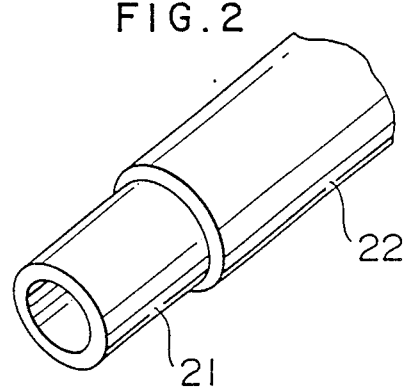
FIG. 2 is a sketch of another sample of the FREON gas hose of this invention, in which 21 refers to an inner tube layer and 22 to an outer tube layer.

For example, in FIG. 1 which is a sketch of a sample of the FREON gas hose of this invention, 1 refers to an inner tube layer made of the thermoplastic elastomer composition, 2 to a braided reinforcing layer and 3 to an outer tube layer. In this sample, the rubber material for forming the outer tube layer is not critical, though an ethylene-propylene rubber or chloroprene rubber which has good weather resistance is preferred. The braided reinforcing layer 2 may be made of any fiber such as nylon, polyester, rayon or the like. In FIG. 2, 21 refers to an inner tube layer made of the thermoplastic elastomer composition of this invention, and 22 to an outer tube layer, for which not only vulcanized rubbers but also various weather resistant thermoplastic elastomers may be used. Specifically, polyolefin-based thermoplastic elastomers and polyester-based thermoplastic elastomers are included in the weather resistant thermoplastic elastomers.

Figure 3:
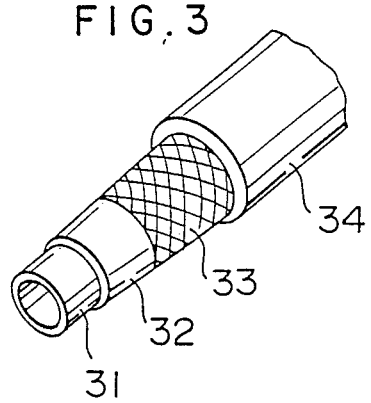
FIG. 3 is a sketch of a further sample of the FREON gas hose of this invention, in which 31 refers to the innermost tube layer, 32 to a second inner tube layer, 33 to a braided reinforcing layer and 34 to an outer tube layer.

The inner and outer diameters of the FREON gas hose of this invention and the wall thicknesses of the inner tube layer and the outer tube layer may be varied depending upon the conditions under which the FREON gas hose is used. As a matter of course, this invention is not limited to the above-mentioned embodiments, and includes other embodiments in which the thermoplastic elastomer composition of this invention is used as the innermost tube layer, such as a three-layer hose in which the innermost tube layer is made of the thermoplastic elastomer composition of this invention, the second inner tube layer is made of a nitrile rubber, chlorosulfonated polyethylene rubber, (halogenated)-butyl rubber or the like and the outer tube layer is as mentioned above, or a four-layer hose as shown in FIG. 3 in which 31 refers to the innermost tube layer, 32 to a second inner(intermediate) tube layer, 33 to a braided reinforcing layer and 34 to the outer tube layer made of an ethylene-propylene rubber, a chloroprene rubber or the like, or other various FREON gas hoses.

DESCRIPTION OF THE PREFERRED EMBODIMENTS

This invention is explained in more detail below referring to Examples which are by way of illustration and not by way of limitation.

EXAMPLE 1

In a closed type mixer (HAAKE RHEOCORD SYSTEM 40 RHEOMIX MIXER 300 manufactured by Haake Buchler), 50 parts by weight of nylon 11 (RILSAN BENSNO, a trade name of TORAY INDUSTRIES, INC.) was melt-mixed with 50 parts by weight of chlorinated butyl rubber (EXXON CHLOROBUTYL 1068) at 200° C. for 10 minutes, and thereafter, the resulting mixture was pressed by an electrically heated press at a pressure of 100 kg/cm$^2$ for 5 minutes to form a sheet having a thickness of 2 mm, a length of 20 cm and a width of 20 cm.

Figure 4:
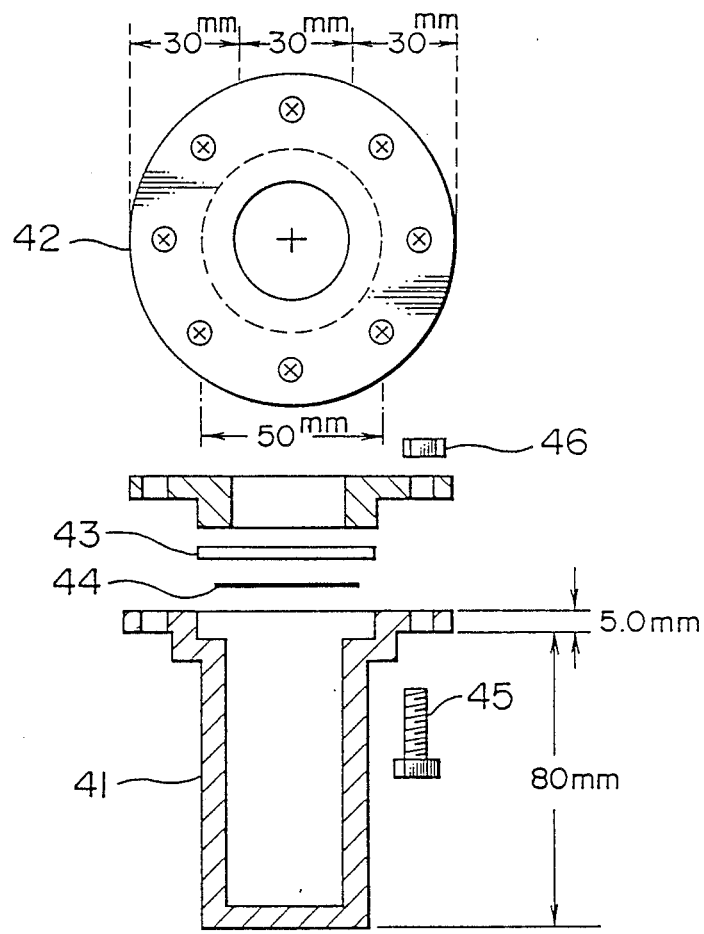
FIG. 4 shows a FREON gas-permeation tester, in which 41 refers to a stainless steel cup, 42 to a stainless steel lid, 43 to a punching board having a permeation area of 1.16 $cm^2$, 44 to a test piece of 2 mm in thickness, and 45 to a bolt and 46 to a nut.

This sheet was subjected to tensile test, oil-resistance test and Gehmann torsional test (low temperature resistance) according to JIS K6301. FREON gas permeability was evaluated by introducing FREON gas R-22 into a stainless steel cup as shown in FIG. 4, putting a circular test piece on the cup as shown in FIG. 4, lidding the cup with a stainless steel lid, thereafter placing the cup in a constant temperature vessel at 50° C., checking the change of the weight with time and determining the amount of FREON gas permeated per unit time per unit area. Flexibility was evaluated by use of JIS A hardness and Shore D hardness. The results obtained are shown in Table 1.

EXAMPLE 2

The same procedure as in Example 1 was repeated, except that 2.0 parts by weight of 4,4'-methylenebiscyclohexylamine and 5.0 parts by weight of magnesium oxide were added as a crosslinking agent in the melt-mixing of 50 parts by weight of nylon 11 with 50 parts by weight of chlorinated butyl rubber, to prepare a test piece, and the test piece was evaluated in the same manner as in Example 1 to obtain the results shown in Table 1.

EXAMPLE 3

The same procedure as in Example 2 was repeated, except that the amounts of the nylon 11 and the chlorinated butyl rubber were changed to 70 parts by weight and 30 parts by weight, respectively, to obtain the results shown in Table 1.

EXAMPLE 4

The same procedure as in Example 2 was repeated, except that the amounts of the nylon 11 and the chlorinated butyl rubber were changed to 40 parts by weight and 60 parts by weight, respectively, to obtain the results shown in Table 1.

EXAMPLE 5

The same procedure as in Example 2 was repeated, except that nylon 12 (RILSAN AESNO, a trade name of TORAY INDUSTRIES, INC). was substituted for the nylon 11 and 1.5 parts by weight of an alkylphenol-formaldehyde resin was used as the crosslinking agent, to obtain the results shown in Table 1.

EXAMPLE 6

The same procedure as in Example 5 was repeated, except that 35 parts by weight of chlorinated butyl a trade name of Japan Synthetic Rubber Co., Ltd.) were substituted for the chlorinated butyl rubber, to obtain the results shown in Table 1.

COMPARATIVE EXAMPLE 1

The same procedure as in Example 1 was repeated, except that the nylon 11 alone was used, to obtain the results shown in Table 1.

COMPARATIVE EXAMPLE 2

The same procedure as in Example 2 was repeated, except that the amounts of the nylon 11 and the chlorinated butyl rubber were changed to 20 parts by weight and 80 parts by weight, respectively, to obtain the results shown in Table 1.

COMPARATIVE EXAMPLE 3

The same procedure as in Example 2 was repeated, except that a vulcanized sheet of an acrylonitrile-butadiene rubber (NBR) which is a conventional material for a FREON gas R-12 hose was substituted for the test piece, to obtain the results shown in Table 1. In this case, the NBR vulcanized sheet was prepared according to the recipe shown in Table 2.

COMPARATIVE EXAMPLE 4

The same procedure as in Example 1 was repeated, except that 50 parts by weight of an acrylonitrilebutadiene rubber (JSR N230S, bound acrylonitrile content: 35% by weight, a product of Japan Synthetic Rubber Co., Ltd.) was substituted for the chlorinated butyl rubber and the melt-mixing was conducted in the presence of 1.0 part by weight of 1,3-bis(t-butylperoxyisopropyl)benzene and 3.0 parts by weight of N,N'-phenylenebismaleimide as a crosslinking agent, to obtain the results shown in Table 1.

EXAMPLE 7

The same procedure as in Example 1 was repeated, except that 50 parts by weight of chlorosulfonated polyethylene (HYPALON 40, a trade name of Showa Neoprene Co., Ltd.) was substituted for the chlorinated butyl rubber, to obtain the results shown in Table 3.

EXAMPLE 8

The same procedure as in Example 7 was repeated, except that the chlorosulfonated polyethylene was previously kneaded with 4 parts by weight of magnesium oxide, 3 parts by weight of pentaerythritol, 1.0 part by weight of sulfur and 2.0 parts by weight of tetramethylthiuram disulfide (TT), per 100 parts by weight of the chlorosulfonated polyethylene, on a twin roll prior to the melt-mixing, to obtain the results shown in Table 3.

EXAMPLE 9

The same procedure as in Example 8 was repeated, except that the amounts of the nylon 11 and the chlorosulfonated polyethylene were changed to 70 parts by weight and 30 parts by weight, respectively, to obtain the results shown in Table 3.

EXAMPLE 10

The same procedure as in Example 8 was repeated, except that the amounts of the nylon 11 and the chlorosulfonated polyethylene were changed to 40 parts by weight and 60 parts by weight, respectively, to obtain the results shown in Table 3.

EXAMPLE 11

The same procedure as in Example 8 was repeated, except that nylon 12 (RILSAN AESNO,,a trade name of TORAY INDUSTRIES, INC.) was substituted for the nylon 11, to obtain the results shown in Table 3.

EXAMPLE 12

The same procedure as in Example 11 was repeated, except that a mixture of 40 parts by weight of chlorosulfonated polyethylene and 10 parts by weight of chlorinated polyethylene (Elasrene 351A, a trade name of Showa Denko K.K.) was substituted for the chlorosulfonated polyethylene, to obtain the results shown in Table 3.

COMPARATIVE EXAMPLE 5

The same procedure as in Example 8 was repeated, except that the amounts of the nylon 11 and the chlorosulfonated polyethylene were changed to 20 parts by weight and 80 parts by weight, respectively, to obtain the results shown in Table 3.

COMPARATIVE EXAMPLE 6

A vulcanized sheet of chlorosulfonated polyethylene was prepared according to the recipe shown in Table 4 and subjected to evaluation in the same manner as in Example 1, to obtain the results shown in Table 3.

EXAMPLE 13

The same procedure as in Example 1 was repeated, except that a 3-liter high temperature kneader manufactured by Moriyama Seisakusho was substituted for the closed type mixer and the melt-mixing was conducted at 210° C. for 10 minutes in the presence of a crosslinking agent consisting of 0.5 part by weight of 1,3-bis(t-butylperoxyisopropyl)benzene (PERKADOX 14/40, a trade name of Kayaku Noury) and 1.0 part by weight of N,N'-phenylenedimaleimide (VULNOC PM, a trade name of Ohuchi Shinko Chemical Industry Co., Ltd.), to obtain the results shown in Table 3.

In addition, hose-extrudability was evaluated by extruding the composition into a hose by means of a 55-mm monoaxial extruder manufactured by Nakatani with a die for tube having an inner diameter of 12 mm and a wall thickness of 1 mm at 200° C. and observing the appearance of the resulting hose. The results obtained are also shown in Table 3.

EXAMPLE 14

The same procedure as in Example 13 was repeated, except that the amounts of the nylon 11 and the halogenated butyl rubber were changed to 30 parts by weight and 70 parts by weight, respectively, to obtain the results shown in Table 3.

TABLE 1

| | Example | | | | | | Comparative Example | | | |
|---|---|---|---|---|---|---|---|---|---|---|
| | 1 | 2 | 3 | 4 | 5 | 6 | 1 | 2 | 3 | 4 |
| Hardness | | | | | | | | | | |
| JIS A | 99 | 99 | 100 | 93 | 98 | 98 | 100 | 87 | 85 | 97 |
| Shore D | 53 | 55 | 57 | 38 | 50 | 49 | 81 | 29 | — | 46 |
| Tensile test | | | | | | | | | | |
| 100% tension (kgf/cm$^2$) | — | 164 | 185 | — | — | — | 350 | — | 73 | 140 |
| Tensile strength (kgf/cm$^2$) | 130 | 193 | 210 | 104 | 137 | 118 | 420 | 42 | 185 | 185 |
| Elongation (%) | 15 | 155 | 160 | 55 | 80 | 70 | 350 | 95 | 350 | 220 |
| Oil resistance (JIS oil No. 3, 100° C. × 70 hrs.) ΔV (%) | 9.4 | 11.0 | 8.5 | 12.1 | 8.2 | 9.0 | 3.1 | 20.1 | 8.0 | 7.0 |
| Low-temp. resistance (Gehmann tortional test) | | | | | | | | | | |
| $T_5$ (°C.) | −57 | <−70 | <−70 | −55 | −67 | −57 | unmeasurable | −49 | −10 | −27 |
| $T_{10}$ (°C.) | −67 | <−70 | <−70 | <−70 | <−70 | −67 | | −57 | −14 | −31 |
| Freon gas permeability (Freon gas R-22, 50° C.) ΔW (mm · g/cm$^2$ · day) | 0.03 | 0.03 | 0.02 | 0.05 | 0.01 | 0.02 | 0.01 | 0.50 | 34.5 | 20.1 |

TABLE 2

| Compounding Recipe | (part by weight) |
|---|---|
| JSR N222L | 100 |
| MT brack | 20 |
| SRF black | 80 |
| Zinc oxide | 5 |
| Stearic acid | 2 |
| Polyester-based plasticizer | 10 |
| Antioxidant | 1 |
| Sulfur | 2 |
| Vulcanization accelerator | 1.8 |
| Vulcanization Conditions | |
| Press-vulcanized at 150° C. for 20 minutes | |

TABLE 3

| | Example | | | | | | | | Comparative Example | |
|---|---|---|---|---|---|---|---|---|---|---|
| | 7 | 8 | 9 | 10 | 11 | 12 | 13 | 14 | 5 | 6 |
| Hardness | | | | | | | | | | |
| JIS A | 98 | 98 | 100 | 94 | 97 | 97 | 90 | 84 | 77 | 79 |
| Shore D | 48 | 50 | 56 | 37 | 48 | 47 | 33 | 29 | 21 | 23 |
| Tensile test | | | | | | | | | | |
| 100% tension (kgf/cm$^2$) | — | 121 | 150 | — | 116 | 110 | — | — | — | 72 |
| Tensile strength (kgf/cm$^2$) | 98 | 138 | 182 | 97 | 135 | 127 | 84 | 70 | 39 | 213 |
| Elongation (%) | 90 | 140 | 170 | 95 | 160 | 130 | 55 | 80 | 450 | 260 |
| Oil resistance (JIS No. 3, 100° C. × 70 hrs) ΔV (%) | 21 | 17 | 11.5 | 30 | 18 | 20 | 10.3 | 26.2 | 120 | 23 |
| Freon gas permeability (Freon gas R-22, 50° C.) ΔW (mm · g/cm$^2$ · day) | 0.07 | 0.06 | 0.03 | 0.15 | 0.06 | 0.09 | 0.04 | 0.10 | unmeasurable | 1.21 |
| Low-temp. resistance (Gehmann tortional test) $T_{10}$ (°C.) | — | — | — | — | — | — | −48 | −50 | — | — |
| Appearance of extruded hose | — | — | — | — | — | — | Good | Good | — | — |

Note: In Comparative Example 5, the Freon gas permeability was unmeasurable because $T_B$ was too small and the hose was broken during the measurement.

TABLE 4

| Compounding Recipe | (part by weight) |
|---|---|
| Hypalon 40 | 100 |
| Magnesium oxide | 4 |
| Pentaerythritol | 3 |
| MT black | 50 |
| Hard clay | 20 |
| Polyester-based plasticizer | 10 |
| Sulfur | 1 |
| Vulcanization accelerator | 2.5 |
| Vulcanization Conditions | |

TABLE 4-continued

Press-vulcanized at 165° C. for, 40 minutes.

What is claimed is:

1. A gas hose for chlorofluorocarbons, chlorofluorohydrocarbons or fluorohydrocarbons, comprising a thermoplastic elastomer composition having oil-resistance and low-temperature resistance, and being resistant to chlorofluorocarbon, chlorofluorohydrocarbon or fluorohydrocarbon permeation, which comprises about 25–95% by weight of a polyamide and 75–5% by weight of a halogenated butyl rubber or a chlorosulfonated polyethylene.

2. The gas hose according to claim 1, wherein a halogenated butyl rubber and the chlorosulfonated polyethylene are partially crosslinked.

3. The gas hose according to claim 1, wherein the polyamide is nylon 11 or nylon 12.

4. The gas hose according to claim 1, which consists essentially of the polyamide and the halogenated butyl rubber.

5. The gas hose according to claim 1, wherein the proportion of the polyamide is 40–70% by weight based on the total weight of all of the polymer components.